(12) United States Patent  (10) Patent No.: US 8,430,550 B2
Lin  (45) Date of Patent: Apr. 30, 2013

(54) BACKLIGHT MODULE

(75) Inventor: I-Thun Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 767 days.

(21) Appl. No.: 12/634,824

(22) Filed: Dec. 10, 2009

(65) Prior Publication Data

US 2010/0232139 A1 Sep. 16, 2010

(51) Int. Cl.
*F21V 7/04* (2006.01)

(52) U.S. Cl.
USPC .......................... 362/615; 313/621; 313/97.1

(58) Field of Classification Search ........ 362/97.1–97.4, 362/611, 612, 615, 621
See application file for complete search history.

(56) References Cited

U.S. PATENT DOCUMENTS

| 5,915,855 | A | * | 6/1999 | Murase et al. ................. 40/546 |
| 7,883,253 | B2 | * | 2/2011 | Wang ............................ 362/613 |
| 2003/0160911 | A1 | | 8/2003 | Kano |
| 2007/0147069 | A1 | * | 6/2007 | Zhu et al. ..................... 362/600 |

FOREIGN PATENT DOCUMENTS

| CN | 1441298 A | 9/2003 |
| CN | 101358712 A | 2/2009 |

* cited by examiner

*Primary Examiner* — Vip Patel
(74) *Attorney, Agent, or Firm* — Altis Law Group, Inc.

(57) ABSTRACT

An exemplary backlight module includes a light guiding plate, a light source, and a light guiding bar. The light guiding plate includes a light incident surface and a light emitting surface. The light guiding bar includes a light incident surface and a light emitting surface. The light incident surface of the light guiding bar faces the light source. The light source is configured for emitting light along a lengthwise direction of the light guiding bar. The light emitting surface of the light guiding bar is opposite to the light incident surface of the light guiding plate. The light emitting surface of the light guiding bar has a larger length than that of the light incident surface of the light guiding plate. Thus two opposite end portions of the light emitting surface of the light guiding bar is offset across from the light incident surface of the light guiding plate.

20 Claims, 11 Drawing Sheets

BACKLIGHT MODULE

BACKGROUND

1. Technical Field

The present disclosure relates to a backlight module and, particularly, to a backlight module having a light guiding plate, a point light source and a light guiding bar for guiding light from the point light source to the light guiding plate.

2. Description of Related Art

Liquid crystal display (LCD) devices have many excellent performance characteristics, such as large-scale information display ability, easy colorization, low power consumption, long lifespan, environmental friendly, and so on. Therefore, liquid crystal display devices are widely used. A typical liquid crystal display device generally includes a backlight module. The backlight module is used to convert linear light sources or point light sources, such as cold cathode ray tubes or light emitting diodes (LEDs, hereinafter), into area light sources with high uniformity and brightness.

When only one LED is employed by the LCD device as the light source, the LED emits the light at a certain range of angle, and generally cannot cover the whole light guiding plate. Thus, the backlight module can have non-uniform brightness. Accordingly, a plurality of LEDs are employed. However, a number of dark regions tend to be formed in areas of the light guide plate, between every two adjacent LEDs.

Therefore, a backlight module which can overcome the above mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Various embodiments will now be described in detail below with reference to the drawings.

Figure 1:
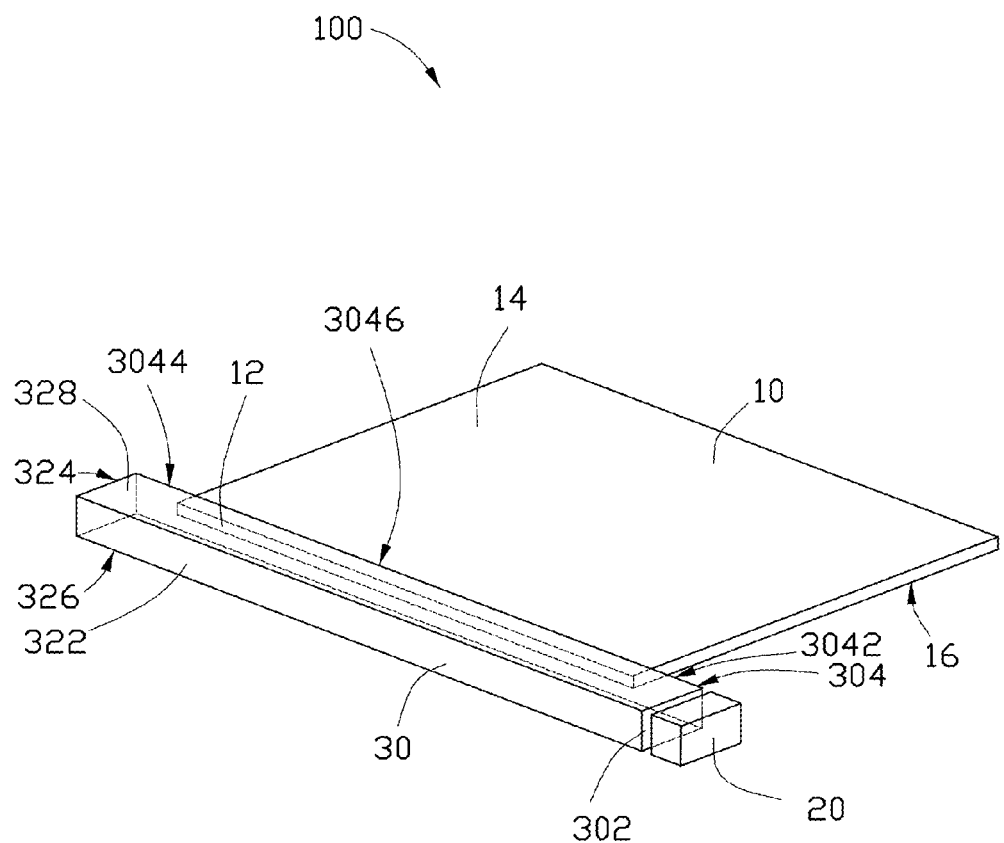
FIG. 1 is a schematic, isometric view of a backlight module according to a first embodiment of the present disclosure.
Figure 2:
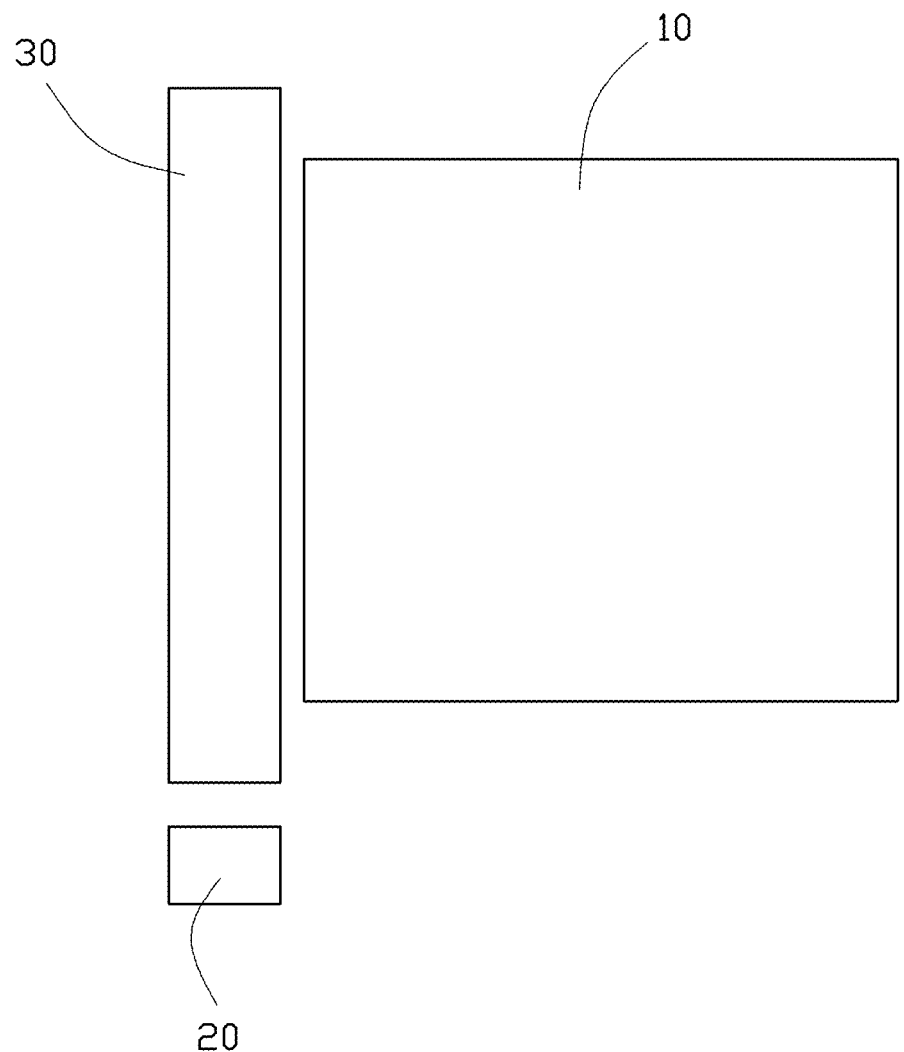
FIG. 2 is a schematic, top view of the backlight module of FIG. 1.
Figure 3:
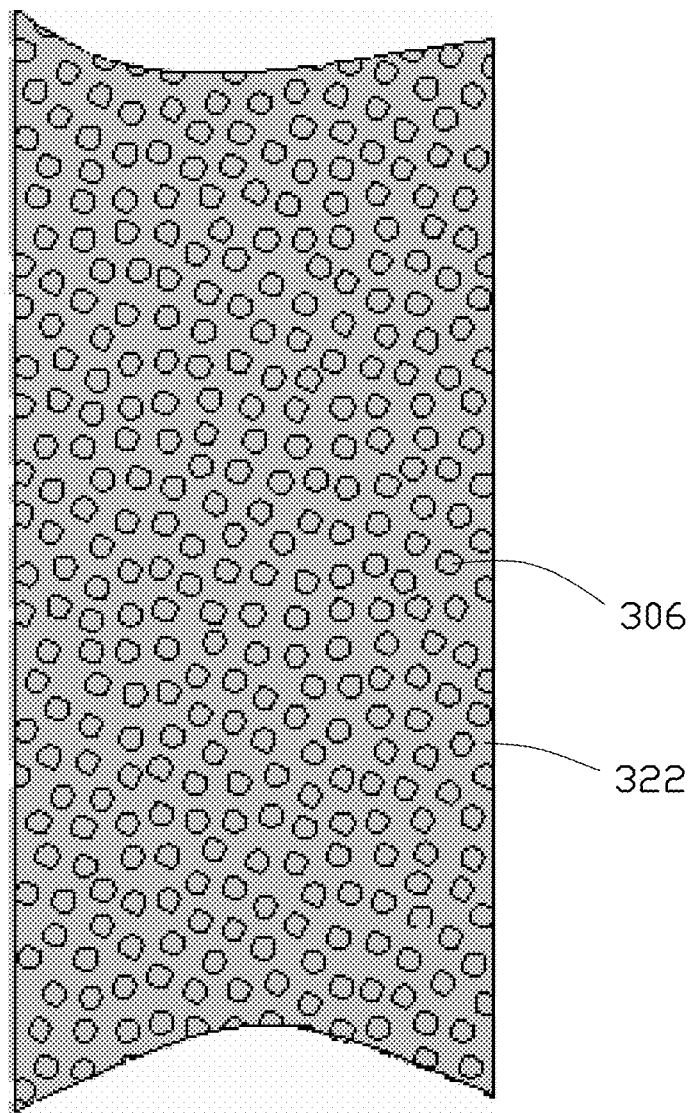
FIG. 3 is a schematic view of pattern dots formed on a first side surface of a light guiding bar of the backlight module as shown in FIG. 1.

Referring to FIGS. 1-3, a backlight module 100 according to a first embodiment is shown. The backlight module 100 includes a light guiding plate 10, a point light source 20, and a light guiding bar 30. In the present embodiment, the point light source 20 is an LED. The point light source 20 is configured for emitting light along the lengthwise direction of the light guiding bar 30.

The light guiding plate 10 includes a light incident surface 12, a light emitting surface 14 connecting the light incident surface 12, and a bottom surface 16 opposite to the light emitting surface 14.

The light guiding bar 30 includes a light incident surface 302, a light emitting surface 304 connecting the light incident surface 302. The light incident surface 302 of the light guiding bar 30 faces the point light source 20. In the present embodiment, the light emitting surface 304 is substantially perpendicular to the light incident surface 302. In the present embodiment, the light guiding bar 30 is a cuboid. The light guiding bar 30 further includes a top surface 328, a bottom surface 326, a first side surface 322 and a second side surface 324 besides the light incident surface 302 and the light emitting surface 304. The first side surface 322 connects the light incident surface 302. The second side surface 324 connects the light emitting surface 304. The first side surface 322 is substantially parallel with the light emitting surface 304. The top surface 328, the bottom surface 326, the first side surface 322, and the second side surface 324 are configured for reflecting light back into the light guiding bar 30. In one embodiment, the top surface 328, the bottom surface 326, the first side surface 322, and the second side surface 324 each are made of light reflective material. In other embodiments, the top surface 328, the bottom surface 326, the first side surface 322, and the second side surface 324 each have a light reflective layer formed thereon. It can be understood that the shape of the light guiding bar 30 is not limited to the present embodiment. The first side surface 322 has patterned dots 306 formed thereon. The pattern dots 306 are to enhance uniformity of the light emitted from the light emitting surface 304 of the light guiding bar 30.

The light emitting surface 304 of the light guiding bar 30 is opposite to the light incident surface 12 of the light guiding plate 10. In the present embodiment, the light emitting surface 304 of the light guiding bar 30 is substantially parallel with the light incident surface 12 of the light guiding plate 10. The width of the light emitting surface 304 of the light guiding bar 30 is larger than that of the light incident surface 12 of the light guiding plate 10 in a Z direction as shown in FIG. 1. The length of the light guiding bar 30 is larger than the length of the light guiding plate 10 along an X direction of the light guiding bar 30. In the present embodiment, the light incident surface 12 of the light guiding plate 10 is aligned with a center portion 3046 of the light emitting surface 304 of the light guiding bar 30. Therefore, two opposite end portions 3042, 3044 of the light emitting surface 304 are not opposite to the light guiding plate 10. That is, orthographic projections of the two end portions 3042, 3044 of the light emitting surface 304 are not within the light incident surface 12 of the light guiding bar 30.

Light from the point light source 20 enters the light guiding bar 30 through the light incident surface 302 of the light guiding bar 30. The light are reflected by the top surface 328, the bottom surface 326, the first side surface 322, and the second side surface 324, and then exits from the light emitting surface 304 of the light guiding bar 30. Subsequently, light from the center portion 3046 of the light emitting surface 304 of the light guiding bar 30 enters the light guiding plate 10 via the light incident surface 12 of the light guiding plate 10, while light from the two end portions 3042, 3044 of the light emitting surface 304 is offset across from the light incident surface 12 of the light guiding plate 10.

Normally, light emitted from the center portion 3046 is uniform, while light emitted from the two end portions 3042, 3044 is relatively non-uniform. Because light from the two end portions 3042, 3044 of the light emitting surface 304 is offset across from the light incident surface 12 of the light guiding plate 10, the non-uniform light is not capable of entering the light guiding plate 10. Thus uniform light can be obtained to enter the light guiding plate 10, and the backlight module 100 can have uniform brightness.

Figure 4:
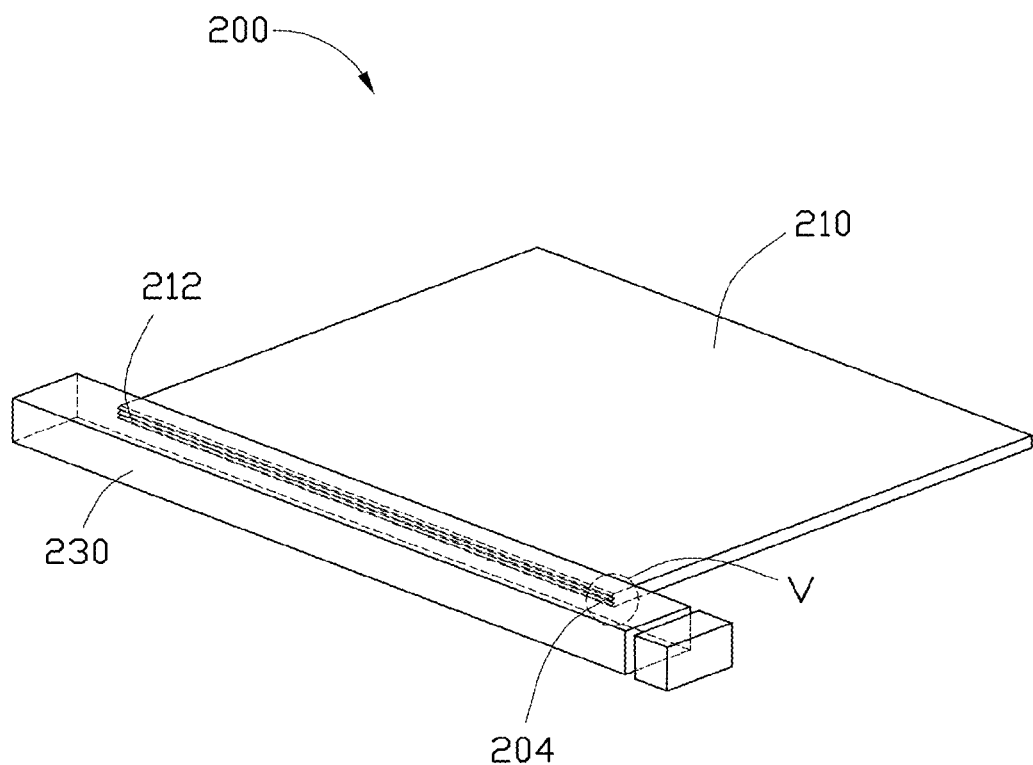
FIG. 4 is a schematic, isometric view of a backlight module according to a second embodiment of the present disclosure.
Figure 5:
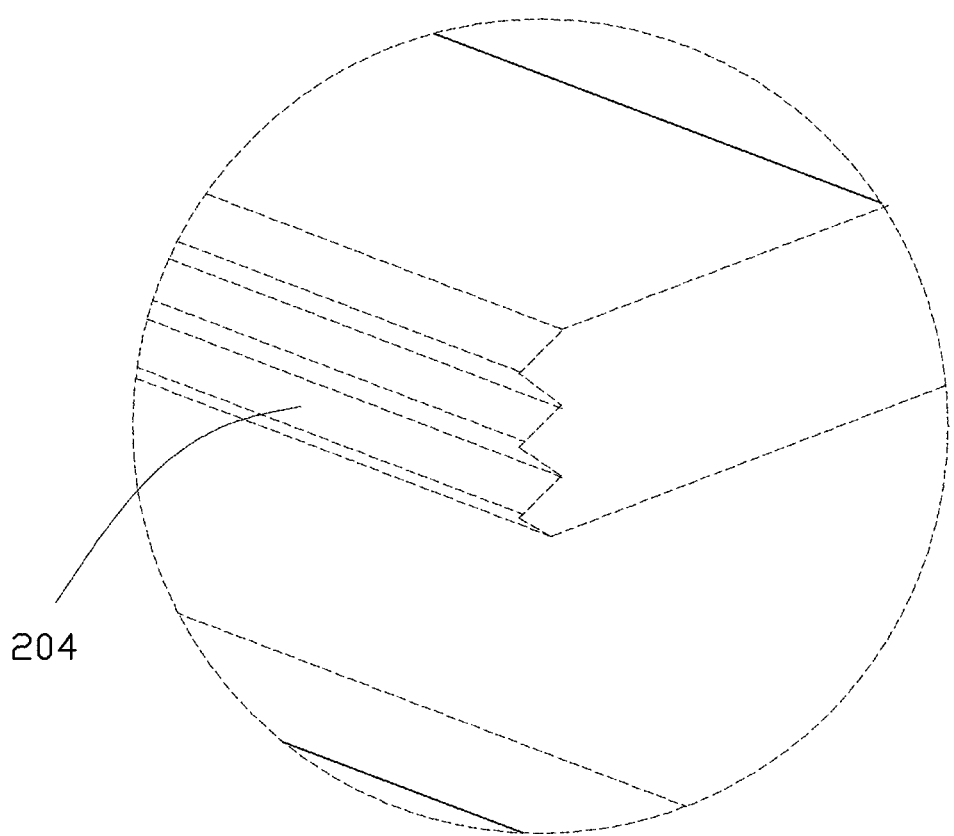
FIG. 5 is an enlarged view of a circled portion V of FIG. 4.

Referring to FIGS. 4-5, a backlight module 200 according to a second embodiment is shown. The backlight module 200 is similar to the backlight module 100. However, a light guiding plate 210 defines a plurality of grooves 204 on a light incident surface 212 thereof. Each groove 204 extends along the lengthwise direction of the light guiding plate 210. Each groove 204 can be V-shaped or U-shaped in cross-section. The grooves 204 are configured for improving uniformity of light entering the light guiding plate 210.

Figure 6:
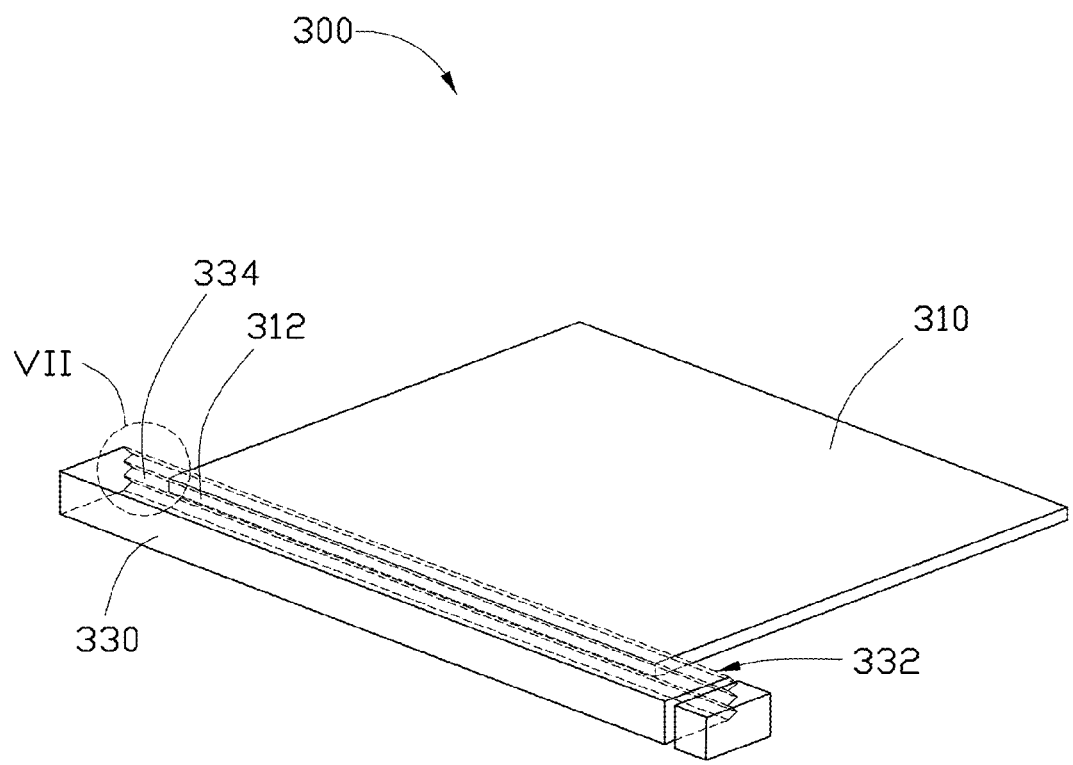
FIG. 6 is a schematic, isometric view of a backlight module according to a third embodiment of the present disclosure.
Figure 7:
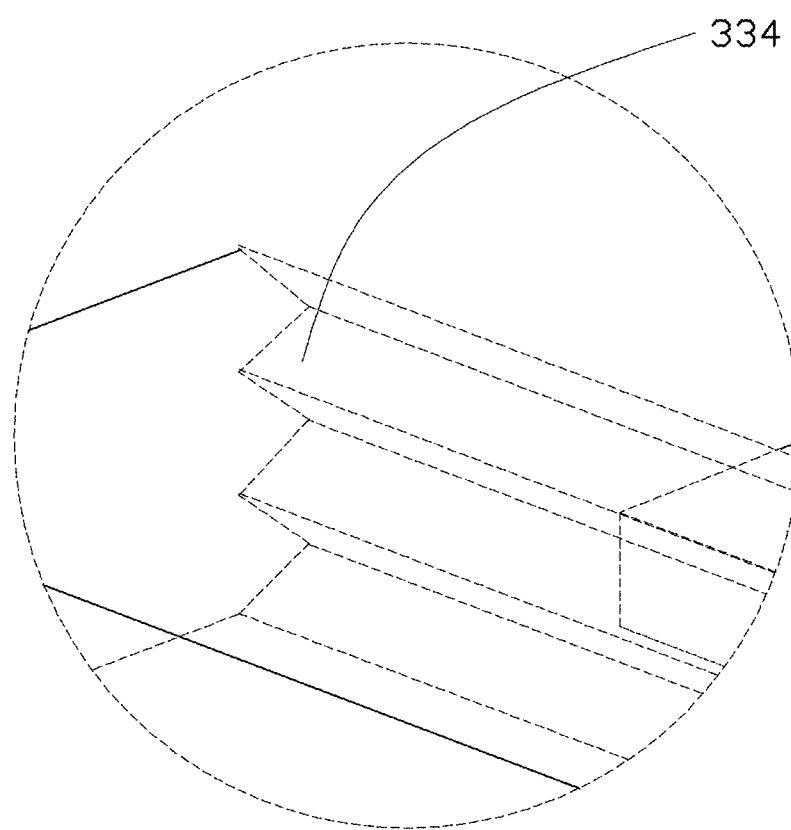
FIG. 7 is an enlarged view of a circled portion VII of FIG. 6.

Referring to FIGS. 6-7, a backlight module 300 according to a third embodiment is shown. The backlight module 300 is similar to the backlight module 100. However, a light guiding bar 330 defines a plurality of grooves 334 on a light emitting surface 332 thereof. Each groove 334 extends along the lengthwise direction of the light guiding bar 330. Each groove 334 can be V-shaped or U-shaped in cross-section. The grooves 334 are configured for improving uniformity of light emitting from the light guiding bar 330.

Figure 8:
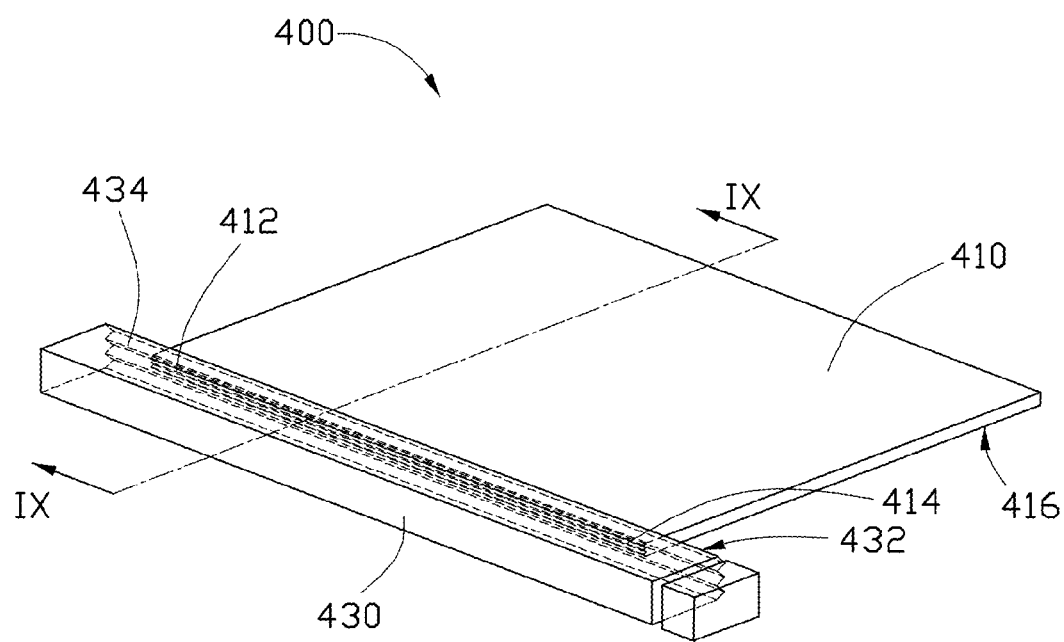
FIG. 8 is a schematic, isometric view of a backlight module according to a fourth embodiment of the present disclosure.
Figure 9:
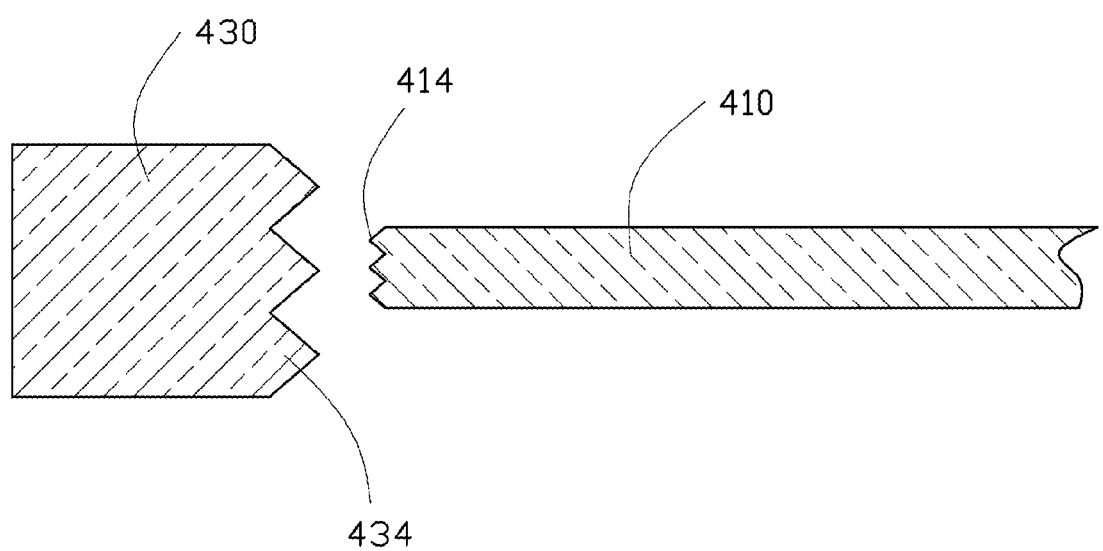
FIG. 9 is a cross-sectional view of the backlight module of FIG. 8, taken along line IX-IX thereof.

Referring to FIGS. 8-9, a backlight module 400 according to a fourth embodiment is shown. The backlight module 400 is similar to the backlight module 100. However, a light guiding bar 430 defines a plurality of grooves 434 on a light emitting surface 432 thereof, and a light guiding plate 410 has a plurality of protrusions 414 formed on a light incident surface 412 thereof. Each groove 434 extends along the lengthwise direction of the light guiding bar 430. Each groove 434 can be V-shaped or U-shaped in cross-section. Each protrusion 414 extends along the lengthwise direction of the light guiding plate 410. Each protrusion 414 can be V-shaped or U-shaped in cross-section. The light guiding plate 401 has pattern dots (not shown) formed on a bottom surface 416 thereof. The pattern dots (not shown) are for improving uniformity of light emitted from the light guiding plate 410.

Figure 10:
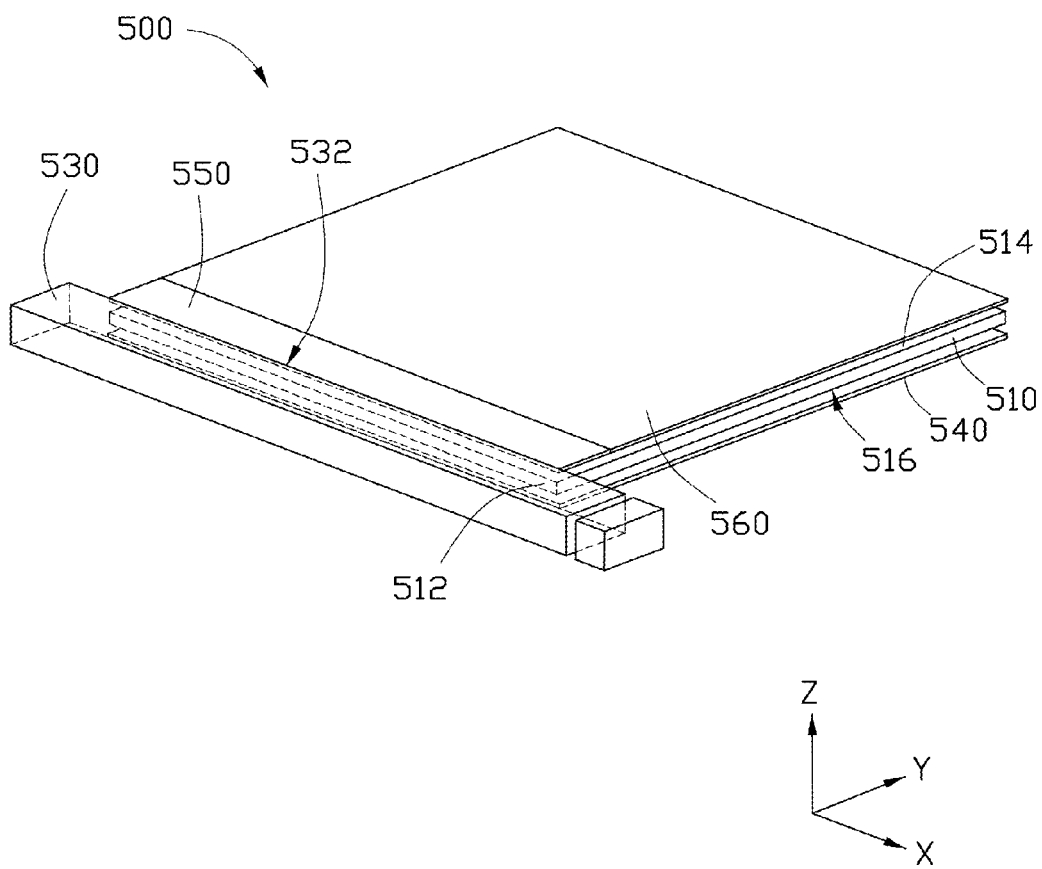
FIG. 10 is a schematic, isometric view of a backlight module according to a fifth embodiment of the present disclosure.

Referring to FIG. 10, a backlight module 500 according to a fifth embodiment is shown. The backlight module 500 is similar to the backlight module 100. However, the backlight module 500 further includes a first reflective sheet 540, a second reflective sheet 550, and an optical correction film 560.

The first reflective sheet 540 is disposed opposite to a bottom surface 516 of a light guiding plate 510. An orthographic projection of the bottom surface 516 of the light guiding plate 510 is within the first reflective sheet 540. The first reflective sheet 540 is for reflecting light back to the light guiding plate 510 so as to improve light utilization efficiency.

The second reflective sheet 550 is disposed above the light emitting surface 514. The second reflective sheet 550 is adjacent to the light guiding bar 530 and extends along an X direction as shown in FIG. 7. The width of the second reflective sheet 550 along a Y direction is from about 2 mm to about 5 mm. The width of the second reflective sheet 550 is much lower than that of the light guiding plate 510 along the Y direction. A portion of light from a center portion 532 of the light guiding bar 530 is not capable of entering the light guiding plate 510, thus the second reflective sheet 550 is for reflecting the portion of light back to the light guiding plate 510. The second reflective sheet 550 is also for preventing light emitting from relatively high luminance region of the light guiding plate 510.

The optical correction film 560 connects the second reflective sheet 550. In the present embodiment, the area defined by the second reflective sheet 550 plus the optical correction film 560 covers the light emitting surface 514 of the light guiding plate 510. The optical correction film 560 is for enhancing light brightness of the backlight module 500.

Figure 11:
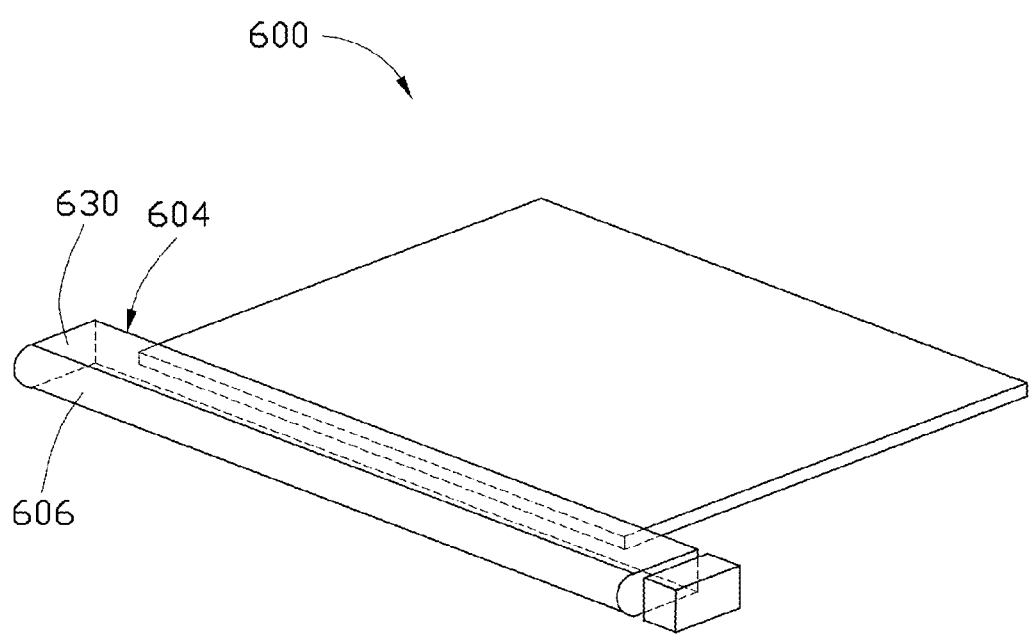
FIG. 11 is a schematic, isometric view of a backlight module according to a sixth embodiment of the present disclosure.

Referring to FIG. 11, a backlight module 600 according to a sixth embodiment is shown. The backlight module 600 is similar to the backlight module 100. However, a first surface 606 opposite to a light emitting surface 604 of the light guiding bar 630 is an elongated curve surface.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope and spirit of the appended claims.

The invention claimed is:

1. A backlight module comprising:
    a light guiding plate comprising a light incident surface, a light emitting surface connecting the light incident surface, and a bottom surface opposite to the light emitting surface;
    a light source; and
    a light guiding bar comprising a light incident surface and a light emitting surface connecting the light incident surface, the light incident surface of the light guiding bar facing the light source, the light source configured for emitting light along a lengthwise direction of the light guiding bar, the light emitting surface of the light guiding bar opposite to the light incident surface of the light guiding plate, the light emitting surface of the light guiding bar having a greater length than a length of the light incident surface of the light guiding plate along the lengthwise direction of the light guiding bar, causing two opposite end portions of the light emitting surface of the light guiding bar being offset across from the light incident surface of the light guiding plate.

2. The backlight module of claim 1, wherein the light emitting surface of the light guiding bar is substantially parallel with the light incident surface of the light guiding plate.

3. The backlight module of claim 1, wherein the light incident surface of the light guiding plate is aligned with a center portion of the light emitting surface of the light guiding bar, the center portion connected between the two opposite end portions.

4. The backlight module of claim 1, wherein a width of the light emitting surface of the light guiding bar is greater than a width of the light incident surface of the light guiding plate in a direction perpendicular to the lengthwise direction of the light guiding bar.

5. The backlight module of claim 1, wherein the light guiding bar further comprises a top surface, a bottom surface, a first side surface, and a second side surface, the first side surface connects the second side surface, the first side surface connects the light incident surface of the light guiding bar, and the second side surface connects the light emitting surface of the light guiding bar.

6. The backlight module of claim 5, wherein the first side surface is substantially parallel with the light emitting surface of the light guiding bar.

7. The backlight module of claim 5, wherein the top surface, the bottom surface, the first side surface, and the second side surface are configured for reflecting light back into the light guiding bar.

8. The backlight module of claim 5, wherein the first side surface has patterned dots formed thereon.

9. The backlight module of claim 5, wherein the first side surface opposite to the light emitting surface of the light guiding bar is an elongated curve surface.

10. The backlight module of claim 1, wherein the light source is a point light source.

11. The backlight module of claim 1, wherein the light guiding plate defines a plurality of grooves on the light incident surface thereof.

12. The backlight module of claim 11, wherein each groove extends along the lengthwise direction of the light guiding bar.

13. The backlight module of claim 1, wherein the light guiding bar defines a plurality of grooves on the light emitting surface thereof.

14. The backlight module of claim 13, wherein each groove extends along the lengthwise direction of the light guiding bar.

15. The backlight module of claim 1, wherein the light guiding bar defines a plurality of grooves on the light emitting surface thereof, and a light guiding plate has a plurality of protrusions on the light incident surface thereof.

16. The backlight module of claim 15, wherein each groove extends along the lengthwise direction of the light guiding bar, and each protrusion extends along the lengthwise direction of the light guiding plate.

17. The backlight module of claim 1, wherein the backlight module further includes a first reflective sheet, a second reflective sheet, and an optical correction film, the first reflective sheet is disposed opposite to the bottom surface of a light guiding plate, the second reflective sheet is disposed above the light emitting surface of the light guiding plate adjacent to the light guiding bar, and the optical correction film connects the second reflective sheet.

18. The backlight module of claim 17, wherein the light incident surface of the light guiding bar is substantially perpendicular to the light incident surface and the light emitting surface of the light guiding plate.

19. The backlight module of claim 17, wherein the width of the second reflective sheet along a direction perpendicular to the lengthwise direction of the light guiding bar is ranged from about 2 mm to about 5 mm.

20. A backlight module comprising:
   a light guiding plate comprising a light incident surface, a light emitting surface connecting the light incident surface, and a bottom surface opposite to the light emitting surface;
   a light source; and
   a light guiding bar comprising a light incident surface and a light emitting surface connecting the light incident surface, the light incident surface of the light guiding bar facing the light source, the light source configured to emit light along a lengthwise direction of the light guiding bar, the light emitting surface of the light guiding bar facing the light incident surface of the light guiding plate for providing light to the light guiding plate,
   wherein a width of the light emitting surface of the light guiding bar is greater than a width of the light incident surface of the light guiding plate along a direction substantially perpendicular to the light emitting surface of the light guiding plate.

* * * * *

UNITED STATES PATENT AND TRADEMARK OFFICE
CERTIFICATE OF CORRECTION

PATENT NO.         : 8,430,550 B2                                      Page 1 of 1
APPLICATION NO.    : 12/634824
DATED              : April 30, 2013
INVENTOR(S)        : I-Thun Lin It is certified that error appears in the above-identified patent and that said Letters Patent is hereby corrected as shown below:

On the Title Page, below Item (22) insert:

-- (30)   Foreign Application Priority Data

Mar. 13 2009   (CN) ...........................2009 1 0300817 --.

Signed and Sealed this
Twenty-fourth Day of December, 2013

Margaret A. Focarino
*Commissioner for Patents of the United States Patent and Trademark Office*